United States Patent [19]

Lohan et al.

[11] Patent Number: 5,258,196
[45] Date of Patent: Nov. 2, 1993

[54] PASTA CHIPS AND PROCESS OF PREPARATION

[76] Inventors: Michael J. Lohan, 1 Glen La., Laurel Hollow, N.Y. 11791; Mariano Orozco, 38-27 Corporal Stone St., Bayside, N.Y. 11361

[21] Appl. No.: 946,603

[22] Filed: Sep. 18, 1992

[51] Int. Cl.$^5$ .............................................. A23P 1/08
[52] U.S. Cl. .................................. 426/560; 426/451; 426/549; 426/557; 426/615
[58] Field of Search ............... 426/451, 557, 615, 622, 426/549, 560, 808

[56] References Cited

U.S. PATENT DOCUMENTS

| | | | |
|---|---|---|---|
| 3,697,290 | 10/1972 | Lynn | 426/549 |
| 3,975,549 | 8/1976 | Shatila et al. | 426/550 |
| 4,455,321 | 6/1984 | Glabe et al. | 426/549 |
| 4,803,917 | 2/1989 | Barbieri | 99/356 |
| 4,906,483 | 3/1990 | Kloos | 426/243 |
| 5,030,462 | 7/1991 | Brimelow | 426/302 |
| 5,124,168 | 6/1992 | McMillin et al. | 426/451 |

FOREIGN PATENT DOCUMENTS 3915009  11/1989  German Democratic Rep. .................................. 426/557

Primary Examiner—Jeanette Hunter
Assistant Examiner—Mary S. Mims

[57] ABSTRACT

A pasta chip and a process for preparing the chip are disclosed.

1 Claim, No Drawings

PASTA CHIPS AND PROCESS OF PREPARATION

FIELD OF THE INVENTION

The present invention relates to the preparation of pasta chips that have very low or no cholesterol; that have low calorific value; that contain no fat; and that are high in carbohydrates.

BACKGROUND OF THE INVENTION

The popularity of potato chips, corn chips, and the like as snacks are well-known and have become a major contributor to the calories consumed by the consuming public. These snack products are usually produced by processes that involve deep fat frying. Attempts to deep fry pasta products has not been successful and, consequently, pasta chips have been absent from the snacks shelves of the supermarkets and grocery stores.

An object of the present invention is to provide a process for preparing a pasta chip product. Another object is to provide a pasta chip that is crispy and substantially free of fat, cholesterol and calories, yet remains as tasty and nutritious as other pasta products.

SUMMARY OF THE INVENTION

This process comprises the steps of:

(a) preparing a feedstock consisting essentially of glutinous flour, Jerusalem artichoke flour or eggs, preferably egg whites, rather than whole eggs, and water to form a dough having a total moisture content up to 25% and containing about 2-25% of Jerusalem artichoke flour or eggs;

(b) kneading and laminating said dough under pressure and at a temperature sufficient to reduce viscosity to form a sheet;

(c) cutting said sheet into individual fresh pasta pieces;

(d) boiling said pasta pieces in water for 5 to 30 minutes to a product loss (starch loss) of less than 15% by weight, preferably less than 10%, usually for no more than 15 minutes; and (e) baking said pieces, the temperature and time of baking being controlled to produce a shaped, crisp pasta chip.

In performing the process of this invention, a feedstock comprised of glutinous flour, water and Jerusalem artichoke flour or egg is utilized. The term "glutinous flour" as used herein is intended to include and describe flours which provide a self-supporting dough when mixed with water. The self-supporting dough, once shaped, will substantially retain its original form under ambient conditions or after subsequent processing, such as drying, cooking or baking.

Semolina flour, also referred to as "semolina" herein, is a common, hard, coarse, wheat flour obtained from durum wheat. The definition for semolina flour is generally a flour obtained from durum wheat which passes through a 20 mesh sieve with not more than 3% by weight passing through a 100 mesh sieve. There are different grades of semolina having different glutinous properties. Both high grade and low grade semolina flours are intended to be included in the glutinous flours suitable for this invention. Other coarse, glutinous flours, obtained from more uncommon grains may be used in place of semolina and are intended to be included within the scope of the term "glutinous flour" as used herein. The fine flours may be preferred where it is difficult to obtain adequate blending with water in the equipment utilized.

The only requirement for the flour is that it provide a substantially self-supporting dough upon admixture with water. The glutinous flour preferably comprises at least 75% by weight of the dry ingredients used in the feedstock. Preferred glutinous flours are semolina and durum flour. Other additives, including seasonings, vitamins, dyes, flavorings, such as cheese, beef and chicken, and vegetable solids such as spinach, may be added up to about 5%, preferably less than 1%, for flavor, color, nutrition or other desired effect. Specific desirable additives for preparing the pasta chips of this invention include the cheeses (parmesan, romano, provolone, etc.), the sauces (marinara, fradiavlo, basic pesto, garlic parsley, oil vinegar, sea food and Alfredo), and the vegetables (tomato, spinach, etc.).

The term "water", as used herein, refers to potable water, including tap water, well water, spring water and the like, as well as to substantially pure forms of water, such as distilled water. If desired, the necessary water can be added as milk, broths, vegetable juices and the like.

The third essential ingredient which may comprise anywhere from 2 to 25% of the feedstock, preferably about 5-20%, is Jerusalem artichoke flour. This flour is prepared by dehydrating whole tubers of the Jerusalem artichoke. The flour, as identified in the "USDA Handbook 8 Composition of Foods", is considered a natural product containing a high level of fructooligosaccharides. It has an extremely low calorific value of less than 1.5 calories per gram.

Instead of the Jerusalem artichoke flour, egg may be substituted in whole or in part, although egg is less desirable than the artichoke flour. The egg may be in the form of liquid, whole eggs or egg whites, as well as the dried egg form.

Thus, the dough used for preparing the chip product of this invention consists essentially of at least 75% glutinous flour, from about 2-25%, preferably about 4-10% of Jerusalem artichoke flour or egg, and about 10-15% moisture.

The feedstock had consisted essentially of at least 75% glutinous flour, about 2-25% Jerusalem artichoke flour or egg and about 10-25% water.

The moisture content of the glutinous flour, the feedstock, and the fresh pasta product may be determined by the procedures set forth in the 9th Ed., "Association of Official Analytical Chemists" (AOAC), Method 13.112, which is incorporated herein by reference. Other methods are also suitable but the AOAC procedures, incorporated above, should be used to define the moisture values set forth herein.

To form the dough into sheets, the feedstock mixture may be fed through the nip of pressure rollers or extruded through a sheeting die with an opening of about 0.032-0.125 inch. The temperature may be ambient, although a slightly higher temperature of up to about 40° C. is preferred. The temperature should be below that which would cause starch gelatinization of the pasta dough at this stage.

The sheet is then cut into the desired predetermined size and shape which may be round, rectangular, etc., using a knife or other conventional cutting equipment. The resulting pasta pieces are then boiled in water from anywhere from 5 to 30 minutes, the time being selected to prevent more than 10% starch gelatinization, as shown by a minimum weight loss.

The pasta pieces are then fed to an oven where they are baked. The temperature and time of baking is controlled to produce the desired browning and crispness in the final pasta chip. The baking process is conventional and would be readily apparent to those skilled in the art.

While the present invention has been disclosed and described herein in what is believed to be the most practical and preferred steps, it is recognized that departures can be made therefrom within the scope of the invention. Therefore, the invention is not to be limited to the details disclosed herein but is to be accorded the full scope of the claims so as to embrace any and all equivalents of the process and product claims.

We claim:

1. A process for preparing a pasta chip product which comprises:
   (a) preparing a feedstock consisting essentially of up to 75% by weight glutinous flour, 2-25% by weight Jerusalem artichoke flour or eggs, and up to 25% by weight water to form a dough;
   (b) kneading and laminating said dough under pressure and at a temperature sufficient to reduce viscosity to form a sheet;
   (c) cutting said sheet into individual fresh pasta pieces;
   (d) boiling said pasta pieces in water to a product loss (starch loss) of less than 15% by weight; and
   (e) baking said pieces, the temperature and time of baking being controlled to produce a crisp pasta chip.

* * * * *